March 26, 1963  B. BARÉNYI  3,082,462
WINDSHIELD WIPER ARRANGEMENT
Filed March 6, 1958  4 Sheets-Sheet 1

INVENTOR.
BÉLA BARÉNYI
BY Dicke and Craig
ATTORNEYS

INVENTOR.
BELA BARENYI

March 26, 1963  B. BARÉNYI  3,082,462
WINDSHIELD WIPER ARRANGEMENT
Filed March 6, 1958  4 Sheets-Sheet 3

INVENTOR.
BELA BARENYI
BY Dicke and Craig
ATTORNEYS

March 26, 1963 B. BARÉNYI 3,082,462
WINDSHIELD WIPER ARRANGEMENT
Filed March 6, 1958 4 Sheets-Sheet 4
FIG. 5a.
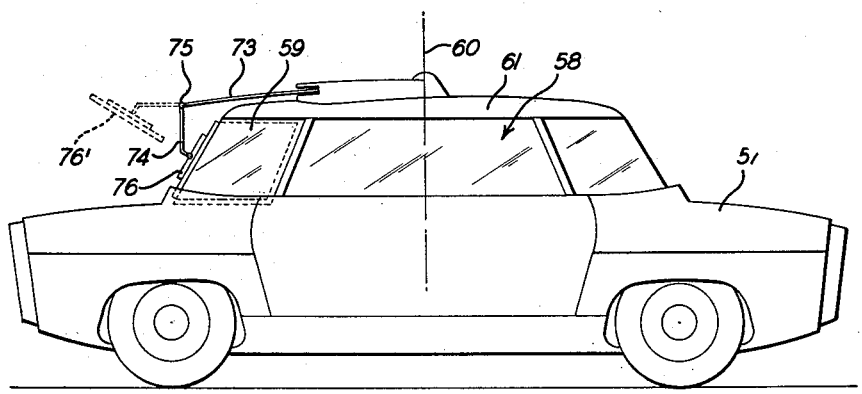
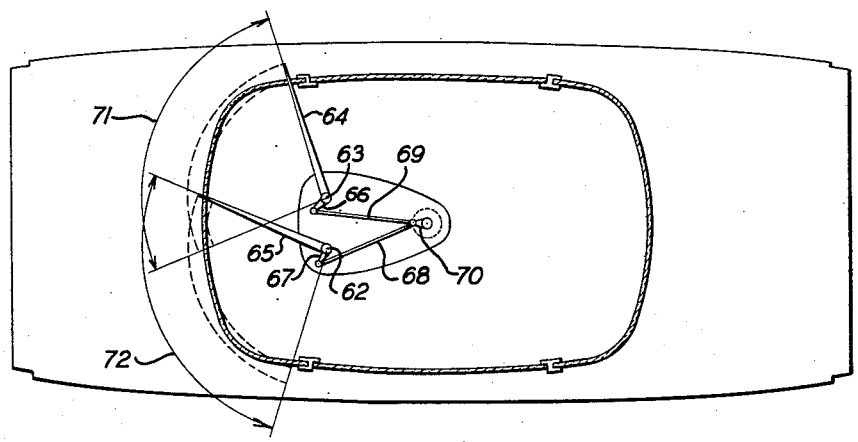
FIG. 5b.
INVENTOR.
BELA BARENYI
BY Dicke and Craig
ATTORNEYS

United States Patent Office 3,082,462
Patented Mar. 26, 1963

3,082,462
WINDSHIELD WIPER ARRANGEMENT
Béla Barényi, Stuttgart-Vaihingen, Germany, assignor to Daimler-Benz Aktiengesellschaft, Stuttgart-Unterturkheim, Germany
Filed Mar. 6, 1958, Ser. No. 719,622
Claims priority, application Germany Mar. 7, 1957
9 Claims. (Cl. 15—250.3)

The present invention relates to a windshield wiper arrangement in vehicles, especially motor vehicles, and to the construction and configuration of the wiper arms and of the wiper blades which slide along the transparent surfaces or body portions and which are resiliently pressed thereagainst.

The present invention particularly serves to enable cleaning of the entire transparent surface of the top of the motor vehicle body, especially in front and in the rear thereof and from the outside thereof.

The present invention is particularly advantageously suitable to be used for that purpose if cylindrical, semicylindrical, conical or double-conically shaped tops of vehicles are to be cleaned thereby.

In the known windshield wiper arrangements of the prior art which are secured at the windshield above or below the same and which are pivoted about an essentially horizontal axis, only an annular sector of the windshield surface is wiped or swept by the wiper blades thereof. These prior art types of windshield wipers are particularly unsuitable to follow the curvatures of the windshields which are oftentimes quite considerable in modern motor vehicles.

Other windshield wiper installations of the prior art which are driven with endless bands, cables or chains which are guided over rollers, require too large a structural expenditure. Furthermore, they are also unsuitable to bring about an even cleaning over all the parts of the surface with very curved window surfaces without special installations.

Moreover, the known prior art installations which serve for the same purpose are altogether unable to clean more than one surface.

The present invention aims at eliminating the aforementioned disadvantages of the prior art, and essentially consists in that the axes of the windshield wipers are arranged at least approximately vertically and on the roof of the vehicle.

Several of the different top constructions for the passenger space of motor vehicles or also for the driver cab of trucks or commercial vehicles which have been proposed in some of my other copending applications or patents are so constructed that they form surfaces or parts of surfaces of cylinders, semi-cylinders, cones or doublecones which in their entirety or in parts thereof are constructed of transparent panes. Such types of tops, for example, for the driver cab, may form parts of conical surfaces, the imaginery apex of the cone being above or below the actually existing outer surfaces, i.e., which are arranged so as to point with the apex or point thereof upwardly or downwardly. With all of these surfaces, the present invention may be advantageously used in such a manner that the pivot axes of the windshield wipers are arranged coaxial or at least approximately coaxial with the axes of the cylindrical or conical surfaces to be cleaned by the wipers.

However, the wiper arms may also be supported within the region of the roof contour which is particularly appropriate if, with tops having a cylindrical or conical surface, the roof of the top rotates above the lateral walls thereof and the wiper arm is secured at the roof, especially near the edge thereof, and rotates together with the roof.

However, with top constructions described hereinabove, it is also possible that the wiper arms are moved along the rim of the roof within a track by means of rollers or a slide member, by means of a cable or chain or the like, in a circle or are thereby reciprocated. In the case of such a construction, the roof structures, of course, are arranged so as to be relatively stationary on the side walls of the top.

A further construction embodiment of the wiper arm in accordance with the present invention consists in that the wiper arm, with cylindrical or conical tops and with a stationary roof, is supported at the center of the roof, i.e., essentially in the axis or coaxial with the axis of the cylinder or cone, and extends beyond and around the rim of the roof to the transparent surfaces or panes disposed therebelow. This type of windshield wiper construction when used with cylindrical or conical tops is suitable to clean the entire panoramic window or pane which may extend around the entire passenger space. Even if the transparent portions of the top are only arranged in front and at the rear thereof, and if, for instance, they form only in front and at the rear thereof parts of a conical outer surface, the present invention may, nonetheless, be used appropriately in a manner proposed hereinabove. In that case, for purposes of increasing the cleaning effect thereof, for example, two windshield wipers may be used. They may then be appropriately secured on a common axis.

With those types of tops which are composed of parts of several cones or cylinders as described in some of my copending applications, several windshield wiper arrangements in accordance with the present invention are advantageously used. For example, in connection with such a top, three windshield wipers may be used and one main axis may be provided for a main lever or arm and two auxiliary axes for two auxiliary levers or arms about which the windshield wipers are pivotally supported. However, only two windshield wipers may be provided.

As already mentioned hereinabove, the transparent window panes or windshields in modern motor vehicles are oftentimes very strongly curved. They also exhibit oftentimes geometrically irregular forms. In order that the windshield wiper is able to follow these irregular geometric forms, a joint is provided in accordance with the present invention between the support of the windshield wiper arm and the wiper blade within the region of the roof edge by means of which it is made possible that the wiper blade is elastically forced against the surface to be cleaned while, at the same time, following the irregular form thereof. By reason of the jointed connection of the wiper blade within the region of the roof edge, it is further made possible to simply pivot the wiper arm portion carrying the wiper blade away from the window pane for purposes of cleaning the latter.

The present invention also makes possible to achieve a further very significant advance in the art in that one wiper arm may carry several wiper blades. These wiper blades may then be so secured at the wiper arm that they operate in several different planes. For example, one windshield wiper blade may clean the front, rear and/or lateral transparent panes of the top, whereas simultaneously therewith, a further windshield wiper blade secured to the same wiper arm cleans the transparent top of the roof itself.

The wiper axles or shafts or the driving motors for the wipers are suitably supported, for example, in transverse girders or bearer members embedded or installed in the roof construction.

Accordingly, it is an object of the present invention to provide a windshield wiper arrangement which is particularly suitable for purposes of effectively cleaning the curved windshields and windows found in the top constructions of modern motor vehicles.

Another object of the present invention is to provide a windshield wiper arrangement in which the wiper arm or arms are pivoted in such a manner as to enable effective cleaning of the curved surfaces, especially if the latter form the outer surfaces of transparent bodies of revolution as cylinders, hemicylinders, cones, double-cones or of other irregular curved geometric surfaces Still another object of the present invention is the provision of a windshield wiper arrangement with wiper arms and blades which enables a cleaning of the top over a substantial part of the periphery or over the entire periphery thereof.

Still another object of the present invention resides in the provision of a drive arrangement and pivotal connection of the wiper arm with the blade which enables the windshield wiper blade to readily follow the configuration and contour of the windshield or transparent surfaces of the top, and which is relatively simple in structure and does not involve excessive expenditures in manufacture, installation, up-keep and repair thereof.

These and other objects, features and advantages of the present invention will become more obvious from the following description when taken in connection with the accompanying drawing, which shows for purposes of illustration only, several embodiments in accordance with the present invention and wherein:

FIGURE 2b is a top plan view of the windshield wiper arrangement and motor vehicle shown in FIGURE 2a.

FIGURE 5a is a side view of a passenger motor vehicle provided with a windshield wiper arrangement in accordance with the present invention; and FIGURE 5b is a top plan view of the passenger motor vehicle shown in FIGURE 5a and indicating therein the arrangement of the windshield wipers in accordance with the present invention.

Figure 1A:
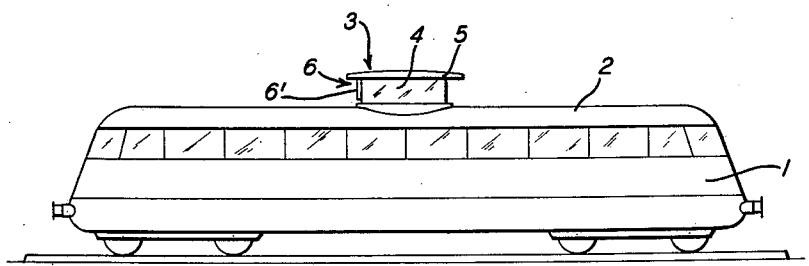
FIGURE 1a is a schematic side view of a rail-type vehicle provided with a roof and windshield wiper arrangement in accordance with the present invention.
Figure 1B:
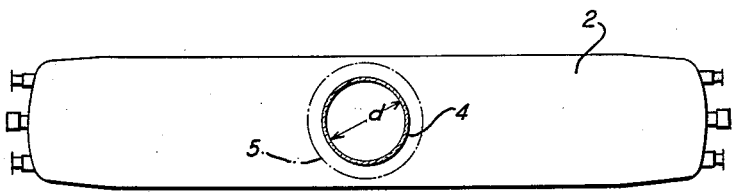
FIGURE 1b is a top plan view of the vehicle shown in FIGURE 1a with the roof removed therefrom.

Referring now to the drawing, wherein like reference numerals are used throughout the various views to designate like parts, and more particularly to FIGURES 1a and 1b, reference numeral 1 designates therein a rail-type vehicle which includes in the center of the vehicle on the roof 2 thereof a panoramic driver cab or look-out turrent generally designated by reference numeral 3. As may be seen from FIGURE 1b, the cab or turret 3 is constructed circularly and consists of a transparent cylindrical body 4 having a diameter d. The roof 5 of the turret or cab 3 which has been omitted in FIGURE 1b for purposes of clarity is rotatably arranged on the transparent body 4 and may be driven in any suitable manner (not shown), for example, by an electric motor. The driving construction for the roof 5 may be of any appropriate construction, such as an electric motor or mechanical drive, which rotates by means of a meshing pinion a toothed internal gear rim secured to the roof 5. Suitable bearings and seals may be provided which, however, have not been shown in detail herein since they may be of conventional construction as is also true of the drive means, and, therefore, form no part of the present invention.

A windshield wiper, for instance, of conventional construction and generally designated by reference numeral 6 is so connected and secured at the roof 5 that the wiper blade 6' thereof is resiliently forced against the transparent surface of the window pane 4. Upon rotation of the roof 5, the cleaning of the entire surface of the transparent body 4 is carried out by the wiper blade 6' of windshield wiper 6.

Thus, by utilizing a rotatable roof structure 5 in connection with a circular transparent cab or turret-like structure 4 for the driver and by connecting the wiper arm with the roof so as to rotate in unison therewith, all of the transparent walls 4 for the driver cab may be continuously cleaned by means of such a windshield wiper 6 upon rotation of the roof 5. If it also understood that instead of one windshield wiper 6, more than one, for instance, two disposed diametrically oppositely, or several windshield wipers may be arranged at the roof 5 so as to clean each sector of the surface 4 several times with each rotation of the roof 5.

Figure 2A:
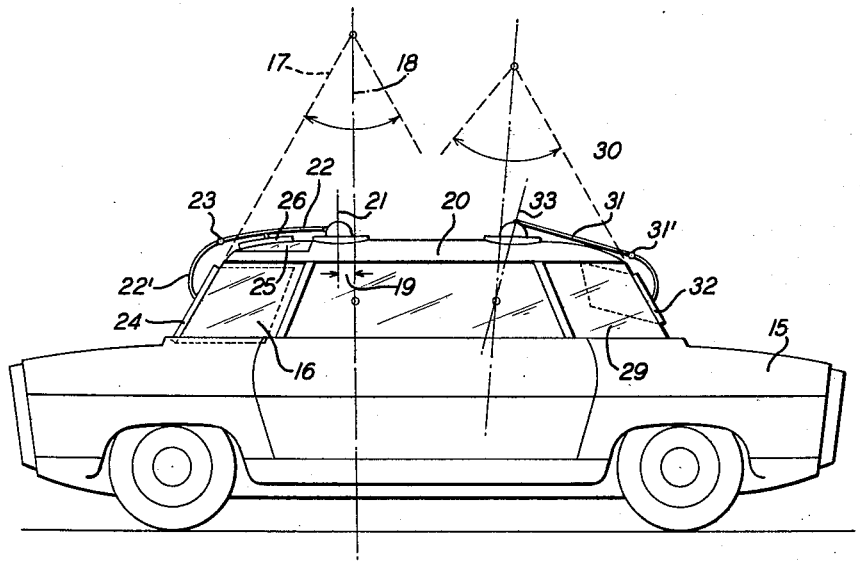
FIGURE 2a is a schematic side view of a passenger motor vehicle having a front and rear window which form parts of the outer surfaces of different cones and which are provided each with a windshield wiper in accordance with the present invention.
Figure 2B:
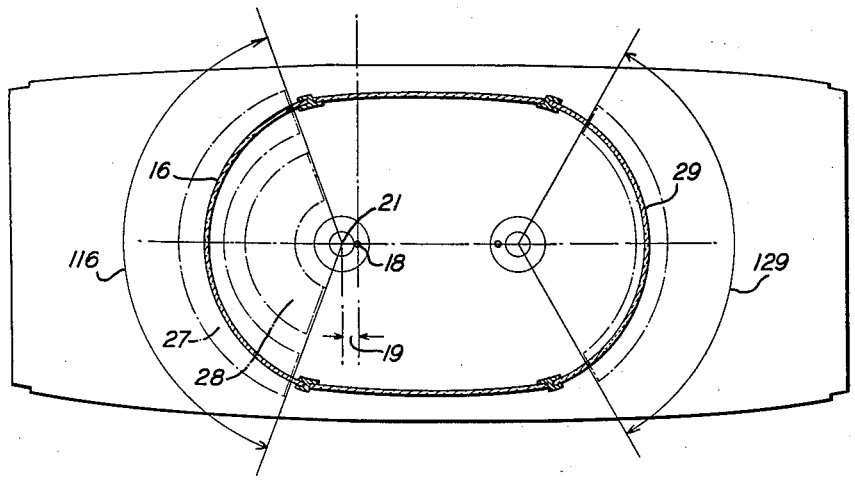

In the embodiment illustrated in FIGURES 2a and 2b of the motor vehicle 15 schematically shown therein, the front window 16 consists of a part of the outer conical surface 17 of the vertical cone having a center axis 18. Even though it is appropriate to arrange the axis of rotation of the windshield wiper in accordance with the present invention coaxial with the axis of the cone, for example, coaxial with the axis 18 thereof, nevertheless it also suffices to arrange the axis of rotation 21 of the windshield wiper at a distance 19 from the axis 18 in order to achieve the effect which the present invention seeks to achieve.

The axis 21 of rotation about which the windshield wiper of the front window 16 rotates is so arranged and secured with the drive means thereof on the roof structure 20 as to extend essentially vertically. The windshield wiper arm 22 thereby extends from this axis of rotation 21 beyond the forward edge of the roof 20 with a joint 23, such as pivotal or universal joint connection, up to the windshield wiper blade 24 by means of which the front window 16 of the vehicle 15 is cleaned. At the height of the forward edge of the roof 20, the lower portion 22' of the windshield wiper arm is pivotally connected to the upper part 22 thereof by means of a joint 23 so that the windshield wiper blade 24 may be pivoted away during cleaning of the window 16.

In the illustrated embodiment of FIGURE 2a and FIGURE 2b, a transparent insert 25 is installed into the roof 20 in the forward part thereof. The insert 25 is cleaned by the wiper blade 26 which is also connected with the wiper arm 22 constructed in accordance with the present invention. Consequently, with the arrangement of FIGURES 2a and 2b, two transparent portions of the top of the vehicle 15 may be simultaneously cleaned.

In FIGURE 2b, in which the roof 20 and windshield wipers have been omitted for the sake of clarity, the surface regions 27 and 28 which are cleaned by the windshield wiper blades 24 and 26 are emphasized by dot-and-dash lines. Moreover, the rear window 29 of the motor vehicle 15 is also formed by a part of a zone of a conical outer surface 30. A wiper arm 31 which may include a joint 31' carries the wiper blade 32 by means of which the cleaning of the rear window 29 takes place. This embodiment illustrates that the axis 33 for the wiper arm 31 does not need to be constructed exactly vertically for carrying out the present invention but may also be arranged at an inclination within small limits, especially in order to reduce the tilting moment for the lever or arm support. It is also within the scope of the invention that axes 21 and 33 may coincide. The angles 116 and 129 again denote the extent of cleaning action effectively obtained with a windshield wiper arrangement in accordance with the present invention.

Figure 3A:
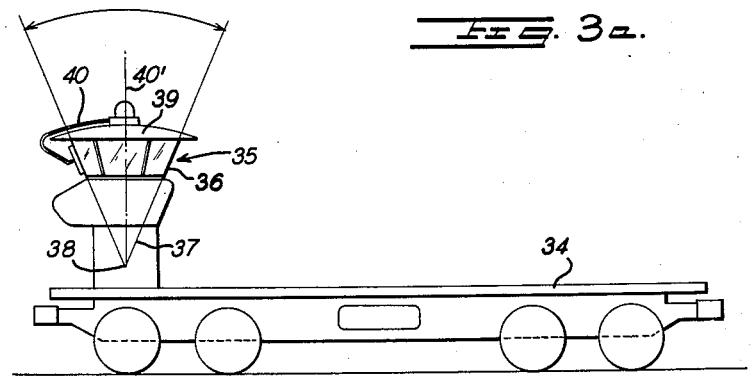
FIGURE 3a is a schematic side view of a truck-type motor vehicle having a windshield wiper arrangement in accordance with the present invention which is effective circularly around the transparent surfaces forming zones of the outer surfaces of a cone.
Figure 3B:
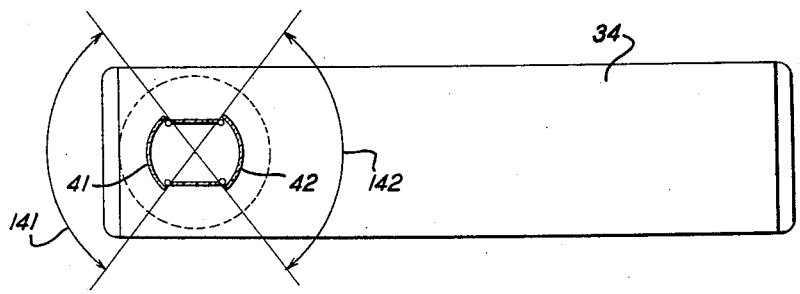
FIGURE 3b is a schematic top plan view of a slightly modified embodiment of the motor vehicle shown in FIGURE 3a and showing therein the front and rear windows which only form part or sectors of a conical surface.

FIGURES 3a and 3b illustrate a motor vehicle 34 which is used for commercial purposes or a truck having a relatively large loading surface. For purposes of steering and controlling this vehicle 34, a driver cab generally designated by reference numeral 35 is provided, the walls 36 of which are constructed essentially as a zone or part of a conical outer surface 37. The imaginery apex 38 of the cone 37 is thereby disposed below the driver cab 35. The axis 40' about which the windshield wiper arm 40 rotates is secured vertically in the uppermost part of the roof 39, with the windshield wiper arm 40 extending beyond the edge of the roof 39 and surrounding the same with the curved portion thereof. In case the transparent walls 36 of the cab 35 are not constructed completely as an annular conical outer surface closed upon itself as shown in FIGURE 3a, but instead are only provided in front and in the rear of the driver cab 35 with conical outer surface portions 41 and 42 as shown in FIGURE 3b, then only the surfaces extending over the angles indicated by the arrows 141 and 142 are cleaned by the windshield wiper arrangement in accordance with the present invention.

It is also understood that in the embodiment according to FIGURE 3a and FIGURE 3b, two windshield wiper arms or more than two windshield wiper arms may be used which are so driven as to either continuously rotate or reciprocate so as to clean the surfaces delineated by arrows 141 and 142, for example, by providing oppositely directed wiper arms which reciprocate to and fro within the angular limits indicated by arrows 141 and 142.

Figure 4:
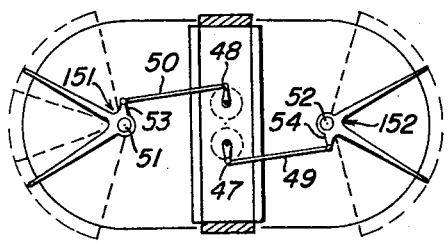
FIGURE 4 is a schematic top plan view of a windshield wiper arrangement for passenger motor vehicles in accordance with the present invention.

FIGURE 4 illustrates a drive arrangement for a windshield wiper consisting of a double wiper each. The two drive arrangements 47 and 48 are arranged in the center of the roof on transverse girder members and are connected by means of connecting rods 49 and 50 with the windshield wiper assemblies generally designated by reference numeral 151 and 152 over lever arms 53 and 54 rigidly connected with the windshield wiper assemblies 151 and 152. The windshield wiper assemblies 151 and 152 indicated therein only schematically are rotatable about the axes 51 and 52 respectively.

The control for the drive arrangements of the two windshield wiper assemblies 151 and 152 may be separate, i.e., in such a way that they can be separately controlled, for example, by providing separate drive motors, or they may be controlled simultaneously, for example, by providing a single drive motor which rotates the crank arms.

The motor vehicle 57 illustrated in FIGURES 5a and 5b includes a top construction generally designated by reference numeral 58 which is provided with symmetrically arranged front and rear portions. In the embodiment illustrated in FIGURES 5a and 5b only the front window 59 is to be cleaned by the windshield wiper arrangement among the windows forming part of the top structure 58.

The common drive axis 60 of the windshield wiper for the front window 59 about which connecting rods 68 and 69 rotate is arranged essentially vertically in the roof 61. The wipers 64 and 65 schematically illustrated are rotatably supported in any suitable manner about auxiliary axes of rotation 62 and 63. Levers 66 and 67 are provided at the wipers 64 and 65, and connecting rods 68 and 69 establish a connection from the ends of levers 66 and 67 with the common drive means 70. The windshield wiper blades of the two wipers 64 and 65, of which only blade 76 is shown in FIGURE 6a, cover and thereby clean respectively the angles designated by reference numerals 71 and 72. The wiper arm of each wiper arrangement in this embodiment is also constructed of two parts whereby the lower wiper arm 74 is pivotally connected with the upper wiper arm 73 by the joint 75. As a result of this construction, the windshield wiper blade 76 may be moved into the position illustrated in FIGURE 5a in dash line and designated therein by reference numeral 76', in which position it may be retained by the joint 75 in any suitable manner, for example, by a spring loaded arrangement, by a detent arrangement, or the like.

While I have shown and described several embodiments in accordance with the present invention, it is understood that the same is not limited thereto but is susceptible of many changes and modifications within the spirit and scope of the present invention, and I, therefore, intend to cover all such changes and modifications as encompassed by the appended claims.

I claim:

1. A windshield wiper arrangement for vehicles having a top including a roof and transparent window means, at least some of said window means having curved surfaces essentially formed by zones of transparent bodies of revolution and disposed below said roof, windshield wiper means including wiper blade means for cleaning at least some of said window means, means including drive means for supporting said wiper means at said roof, said drive means being effective to move said wiper means about an essentially vertical axis approximately coaxial with a respective axis of revolution of the corresponding transparent body of revolution, said wiper blade means moving in a substantially horizontal path during operation thereof.

2. A windshield wiper arrangement for vehicles according to claim 1, wherein said wiper blade means in the horizontal path of movement thereof cleans substantially the entire surface of the associated window means.

3. A windshield wiper arrangement for vehicles, particularly motor vehicles, provided with a top having a roof and transparent window means, at least some of said window means having curved surfaces essentially formed by zones of transparent bodies of revolution disposed below the roof, windshield wiper means including a plurality of wiper blade means for cleaning at least some of said window means, means for supporting said wiper means at said roof including drive means for oscillating at least some of said windshield wiper means about a common axis approximately coaxial with a respective axis of revolution of the corresponding body of revolution, said window means including at least one window surface, and said wiper blade means including two wiper arms per window surface.

4. A windshield wiper arrangement for vehicles, particularly motor vehicles, provided with a top having a roof and transparent window means, at least some of said window means having curved surfaces essentially formed by zones of transparent bodies of revolution disposed below the roof, windshield wiper means including a plurality of wiper blade means for cleaning at least some of said window means, means for supporting said wiper means at said roof including drive means for oscillating at least some of said windshield wiper means about a common axis approximately coaxial with a respective axis of revolution of the corresponding body of revolution, said window means including window means in the roof, said wiper blade means including two wiper blades, and one of said wiper blades moving over the window means in the roof.

5. A windshield wiper arrangement for vehicles according to claim 1, wherein said corresponding transparent body of revolution is a cylinder.

6. A windshield wiper arrangement for vehicles according to claim 1, wherein said corresponding transparent body of revolution is a hemi-cylinder.

7. A windshield wiper arrangement for vehicles, particularly motor vehicles, provided with a top having a roof and transparent window means, at least some of said window means having curved surfaces essentially formed by zones of transparent bodies of revolution disposed below the roof, windshield wiper means including a plurality of wiper blade means for cleaning at least some of said window means, and means for supporting said wiper means at said roof including drive means for oscillating at least some of said windshield wiper means about a common axis approximately coaxial with a respective axis of revolution of the corresponding body of revolution.

8. A windshield wiper arrangement for vehicles, particularly motor vehicles, provided with a top having a roof and transparent window means, at least some of said window means having curved surfaces essentially formed by zones of transparent bodies of revolution disposed below the roof, windshield wiper means including wiper blade means for cleaning at least some of said window means, means for supporting said wiper means at said roof including drive means for oscillating at least some of said windshield wiper means about an axis approximately coaxial with a respective axis of revolution of the corresponding body of revolution, said wiper means including arm means driven by said drive means and connected to said wiper blade means, said arm means having at least one portion extending downwardly past the edge of said roof, said arm means including two wiper arms per window surface, and said arm means having a common axis of oscillation.

9. A windshield wiper arrangement for vehicles according to claim 7, wherein said vehicle includes cross girder means in said top, and wherein said drive means is supported on said cross girder means.

References Cited in the file of this patent
UNITED STATES PATENTS

| | | |
|---|---|---|
| 2,298,763 | Herzog | Oct. 13, 1942 |
| 2,401,961 | Rappl | June 11, 1946 |
| 2,580,577 | Nally | Jan. 1, 1952 |
| 2,787,018 | Smith | Apr. 2, 1957 |

FOREIGN PATENTS

| | | |
|---|---|---|
| 479,643 | Italy | Apr. 7, 1953 |
| C11434 II/63C | Germany | Oct. 25, 1956 |